May 22, 1923.

L. L. DRIGGS ET AL

ELASTIC SUSPENSION FOR VEHICLES

Filed March 27, 1920    5 Sheets-Sheet 1

INVENTORS.
L. L. Driggs and L. L. Driggs, Jr.
by Wilkinson & Giusta
ATTORNEYS.

Patented May 22, 1923.

1,456,371

UNITED STATES PATENT OFFICE.

LOUIS L. DRIGGS AND LOUIS L. DRIGGS, JR., OF NEW YORK, N. Y.

ELASTIC SUSPENSION FOR VEHICLES.

Application filed March 27, 1920. Serial No. 369,295.

*To all whom it may concern:*

Be it known that we, LOUIS L. DRIGGS and LOUIS L. DRIGGS, Jr., both citizens of the United States, residing at New York city, in the county of New York and State of New York, have invented certain new and useful Improvements in Elastic Suspensions for Vehicles; and we do hereby declare the following to be a full, clear, and exact description of the invention, such as will enable others skilled in the art to which it appertains to make and use the same.

This present invention relates to improvements in elastic suspension for vehicles, in which it is desired to minimize the shock experienced in going over inequalities in the road or roadbed.

Our invention comprises an apparatus in which the weight of the body of the vehicle, comprising the chassis and the parts carried thereby, is supported upon a series of springs which may or may not be enclosed in cylinders containing liquid, and these cylinders are provided with means to regulate the flow of the liquid from one side to the other of the pistons which are also mounted in the cylinders, as will be hereinafter more fully described.

The invention will be more fully understood after reference to the accompanying drawings, in which like parts are indicated by similar reference symbols throughout the several views, and in which:—

A represents the main frame of the chassis, B the front axle, B' the rear axle; C and C' represent, respectively, the front and rear wheels.

D represents a hydraulic cylinder filled with suitable liquid, preferably a non-freezing mixture of glycerine and water, and provided with slots D°, preferably contracted, as at $d$, to throttle down slowly when the springs are compressed, and contracted, as at $d'$, to throttle down more rapidly when the springs expand. This cylinder is secured to the main frame of the chassis A by means of the bracket E shown most clearly in Figure 7.

Mounted in each cylinder is a piston F which is screwed on the piston rod F' and engages the coil spring G, which is a stout spring held under compression between the piston and the rear end of the cylinder D. This piston rod passes through a suitable gland in the cylinder head, and is connected by the link H to the bell crank lever I, pivoted at $i$ to the frame K carried by the axle.

Figure 1:
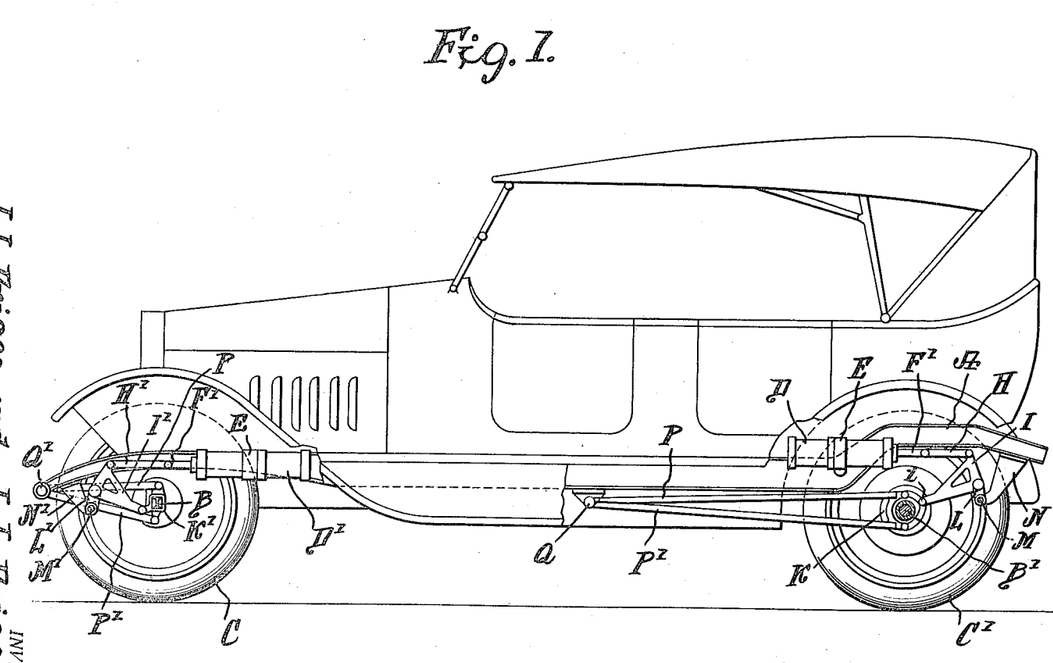
Figure 1 is a side elevation of an automobile fitted with our improved spring suspension, parts being broken away.
Figure 2:
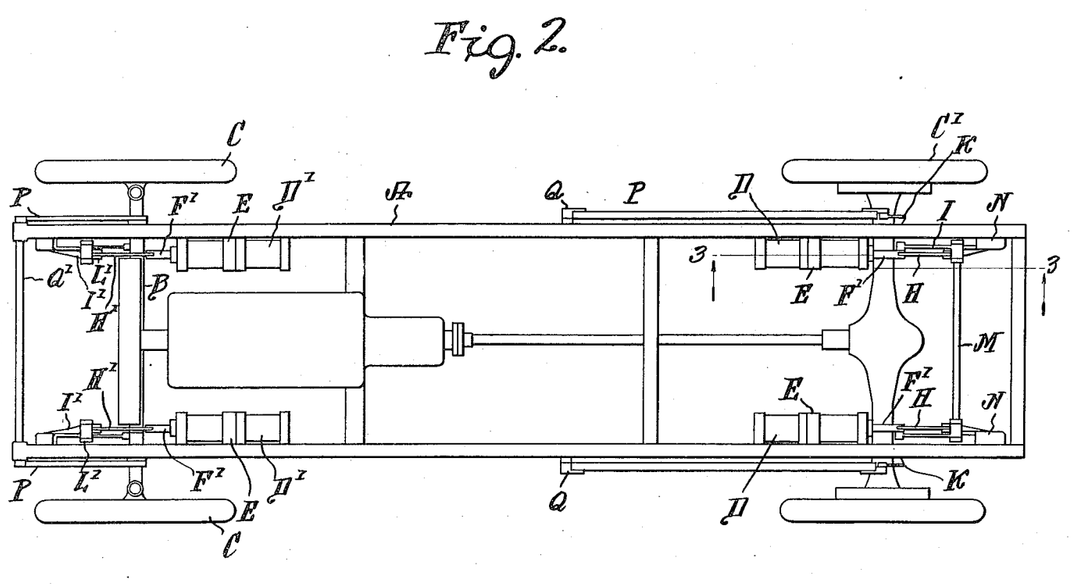
Figure 2 is a diagram showing a plan view of the chassis of an automobile fitted with our improved spring suspension.
Figure 3:
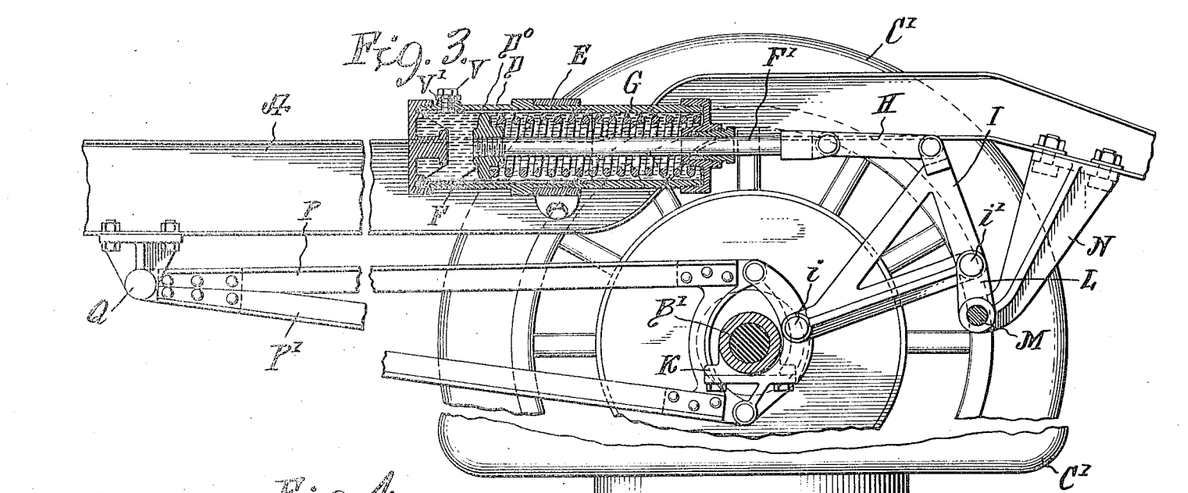
Figure 3 shows a section through Figure 2 along the line 3—3 of said figure, and looking in the direction of the arrows, the parts being shown on a much larger scale than in Figure 2, and the piston and suspension spring in the hydraulic cylinder being shown in the normal position.
Figure 4:
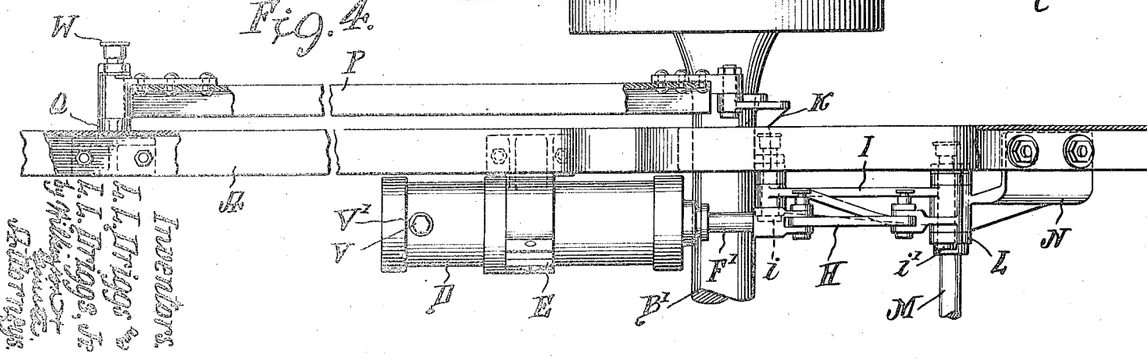
Figure 4 is a plan view of the parts shown in Figure 3, parts being broken away.
Figures 5, 6, 7, 8:
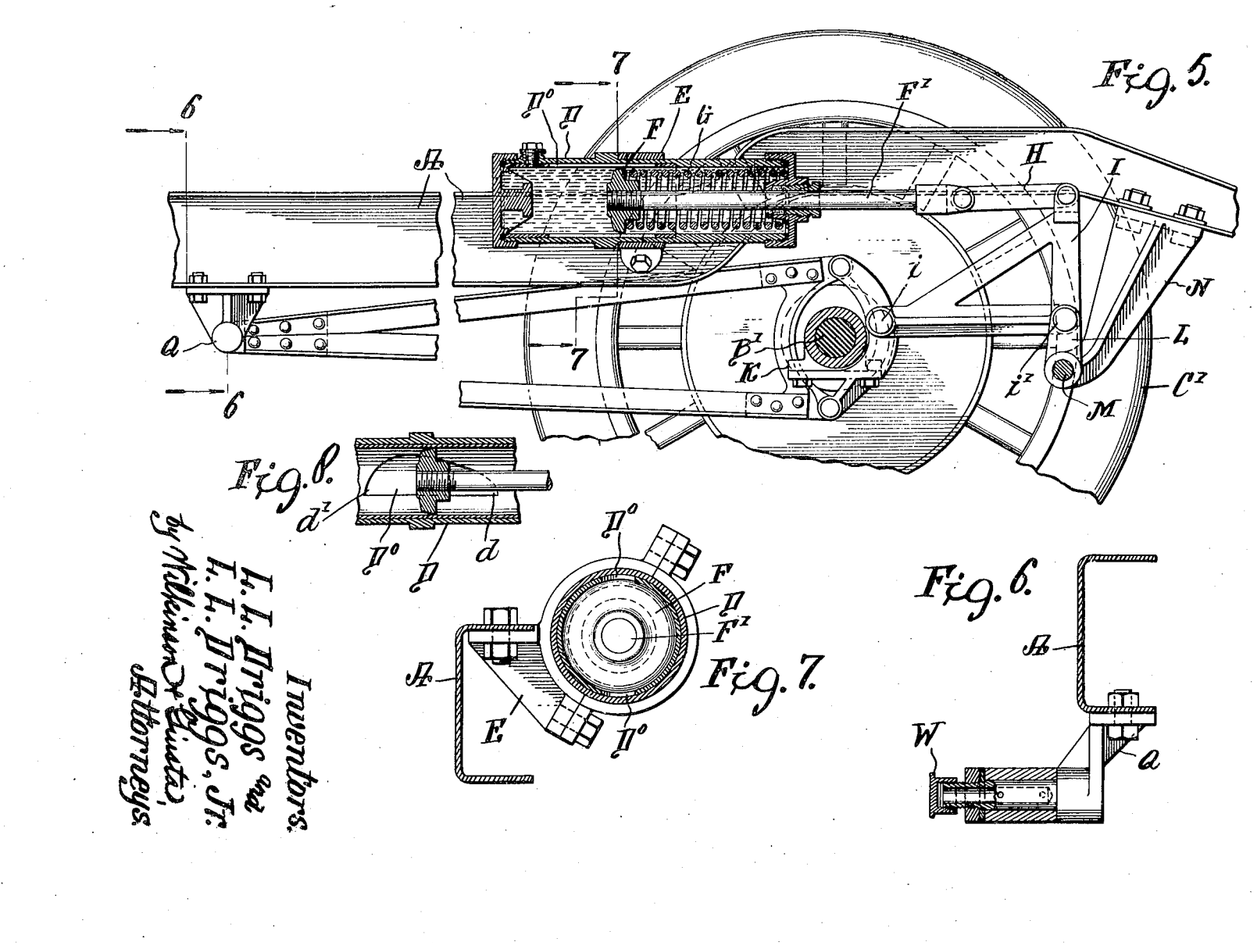
Figure 5 is a similar view to Figure 3, but shows the suspension spring in the compressed position and the piston rod partly withdrawn, the parts being then in the position assumed just after an obstruction in the roadbed has been struck.
Figure 6 shows a section along the line 6—6 of Figure 5, and looking in the direction of the arrows.
Figure 7 shows a section along the line 7—7 of Figure 5, and looking in the direction of the arrows.
Figure 8 is a detail showing the interior hydraulic cylinder with the port therein for regulating the flow of fluid from one side of the piston to the other, the parts being shown on a smaller scale than in Figure 7.
Figure 9:
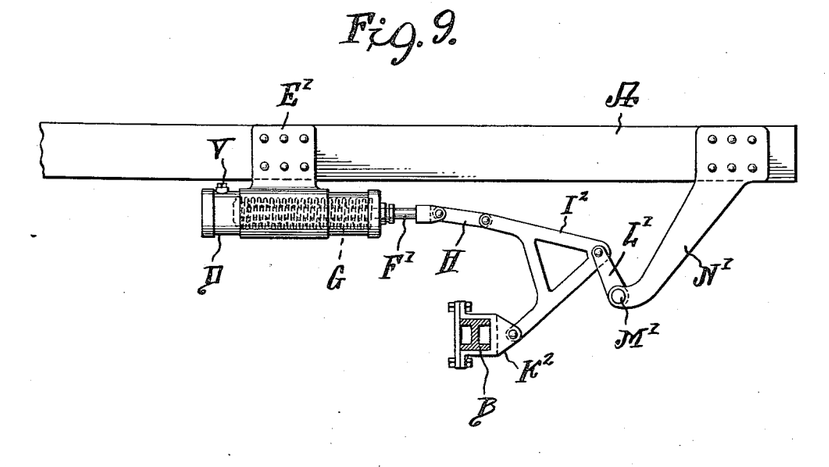
Figure 9 is a modified form of device adapted to be either attached to the front or rear axle.
Figure 10:
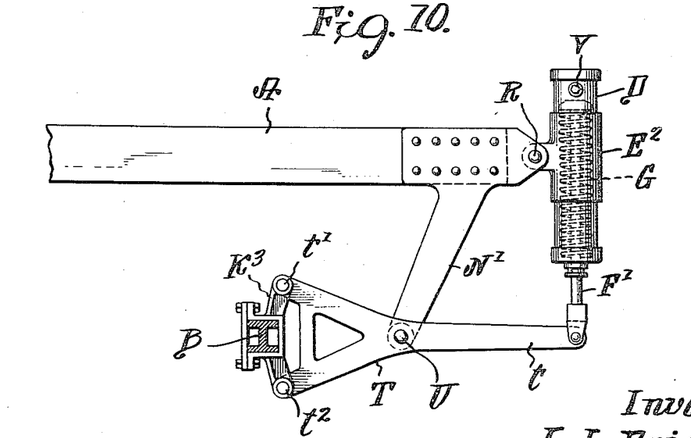
Figure 10 shows another modification in which the spring containing cylinder is shown in the substantially vertical position.

In making connections to the front and rear axle the parts are reversed, and the connections to the rear axle are shown in detail in Figures 3, 4 and 5, and to the front axle in Figures 1 and 2, and also in the modifications shown in Figures 9 and 10.

Referring for the present to Figures 1 to 8, the bell cranks I are connected at $i'$ to the links L, pivoted to the rod M passing through the opposite hangers N, and the weight of the rear end of the vehicle body will rest on this rod M, and this weight pulling down on the links L will tend to rock the bell cranks I about the pivots $i$, pulling on the links H which will cause the piston rods F and pistons F' to compress the springs G, and thus the entire weight of the rear end of the vehicle will be thrown on the two rear springs G.

With regard to the support for the front end of the vehicle, the arrangement is generally similar, but the parts are in a measure reversed, the hydraulic cylinders D' having their springs and pistons and ports similar to those already described with reference to the rear cylinders. The piston rods F' are connected by the links H' to the bell cranks I', pivoted to the frames K' carried by the front axle B, and these bell cranks are connected by the links L' to the stub shafts M', connected to the hangers N' carried by the main frame A of the chassis.

These frames K and K' are connected to the chassis by the torque rods or torsion members P and P' so that any thrust on the axles transmitted from the wheels may be transferred to the chassis. These torsion members are pivoted to the body of the chassis, as at Q and Q', respectively.

In the modification shown in Figure 9 the hydraulic cylinder D is secured to the main frame A of the chassis by means of the bracket E', and the bell crank I² is connected to a frame K² surrounding the front axle B.

The operation of the parts shown in Figure 9 is similar to that of the construction shown in the other figures and will be hereinafter more fully described.

In the construction shown in Figure 10, the bracket E² carrying the cylinder D is pivoted to the end of the main frame A of the chassis, as at R, so that the cylinder may be held in a substantially vertical position and yet allowed to rock about the pivot R. In this form of construction the piston rod F' is connected to the arm t of the frame T which is secured as at t' and t² to the frame K³, and this frame T is pivoted, as at U, to the hanger N', so that as the axle moves upwards or downwards relative to the main frame of the chassis, the arm t would be down or up, carrying with it the piston rod F', and the rocking of the cylinder would permit the piston rod to be drawn out or forced in with a straight pull.

With regard to Figures 9 and 10, it will be obvious that the construction would be duplicated on each side of the car.

The operation of all of the various forms of the device would be to throw more stress on the piston rods as the load of the vehicle increased, which would tend to compress the springs, and the weight of the vehicle would always be balanced by these springs. If obstruction was encountered in the roadbed when traveling at appreciable speed it would cause a sudden thrust upwards on one or both of the front wheels and afterwards on one or both of the rear wheels, and this sudden thrust upwards on the axle would act in the same manner as if the weight of the vehicle were suddenly increased, tending to suddenly compress the springs; and this compression of the springs would be regulated by the flow of the liquid through the control ports. After the obstruction had been passed, the rebound of the vehicle body would be taken care of by the choking-down action of the forward portion d' of the ports in the hydraulic cylinders.

Thus it will be seen that the weight of the body of the vehicle will at all times be supported on the springs, and these springs, together with the liquid contained in the cylinders, will act as a shock absorber, thus lessening the discomfort to the occupant of the vehicle, and at the same time decreasing the wear and tear which inevitably follows violent shocks.

The various hydraulic cylinders should preferably be provided with suitable filling openings V, closed with caps V'. Moreover, the various pivots may be lubricated in any convenient way, as by means of the grease cup arrangement W shown in Figures 4 and 6.

It will be obvious that various changes might be made in the herein described construction, and in the combination and arrangement of parts which could be used without departing from the spirit of our invention; and we do not mean to limit the invention to such details except as particularly pointed out in the claims.

Having thus described our invention what we claim and desire to secure by Letters Patent of the United States is:—

1. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, and a bell crank lever arrangement connected to said hanger and connecting said piston rod and said frame, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

2. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, and a bell crank lever arrangement connected to said hanger and connecting said piston rod and said frame, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

3. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, a lever arrangement connected to said hanger and connecting said piston rod and said frame, and torsion rods connecting said frame with the body of the vehicle, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

4. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, a lever arrangement connected to said hanger and connecting said piston rod and said frame, and torsion rods connecting said frame with the body of the vehicle, the said cylinder and piston being so constructed and arranged that said spring and the liquid contained in said hydraulic cylinder coact to resist sudden pressures appplied to said piston when the downward thrust of the chassis is increased, and means controlled by said liquid alone for checking the relative movement of the axle and the chassis when the downward thrust of the chassis on the axle is decreased, substantially as described.

5. An elastic suspension for vehicles, comprising a plurality of hydraulic cylinders carried by the vehicle body, pistons mounted in said cylinders, piston rods attached to said pistons, coil springs mounted in said cylinders and held under compression between one face of the piston and the opposite end of the cylinder, frames carried by the axles, hangers connected to the vehicle body, and bell crank lever arrangements connected to said hangers and connecting said piston rods and said frames, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

6. An elastic suspension for vehicles, comprising a plurality of hydraulic cylinders carried by the vehicle body, pistons mounted in said cylinders, piston rods attached to said pistons, said cylinders being each provided with means for regulating the flow of liquid past said pistons, coil springs mounted in said cylinders and held under compression between one face of the piston and the opposite end of the cylinder, frames carried by the axles, hangers connected to the vehicle body, and bell crank lever arrangements connected to said hangers and connecting said piston rods and said frames, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

7. An elastic suspension for vehicles, comprising a plurality of hydraulic cylinders carried by the vehicle body, pistons mounted in said cylinders, piston rods attached to said pistons, coil springs mounted in said cylinders and held under compression between one face of the piston and the opposite end of the cylinder, frames carried by the axles, hangers connected to the vehicle body, lever arrangements connected to said hangers and connecting said piston rods and said frames, and torsion members connecting said frames with the body of the vehicle, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

8. An elastic suspension for vehicles, comprising a plurality of hydraulic cylinders carried by the vehicle body, pistons mounted in said cylinders, piston rods attached to said pistons, said cylinders being each provided with means for regulating the flow of liquid past said pistons, coil springs mounted in said cylinders and held under compression between one face of the piston and the opposite end of the cylinder, frames carried by the axles, hangers connected to the vehicle body, lever arrangements connected to said hangers and connecting said piston rods and said frames, and torsion members connecting said frames with the body of the vehicle, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

9. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, and a bell crank lever pivoted to said frame, and links connecting said bell crank lever to said hanger and to said piston rod, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

10. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, a bell crank lever pivoted to said frame, and links connecting said bell crank lever to said hanger and to said piston rod, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

11. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, a bell crank lever pivoted to said frame, and links connecting said bell crank lever to said hanger and to said piston rod, and torsion members connecting said frame with the body of the vehicle, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

12. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, a bell crank lever pivoted to said frame, and links connecting said bell crank lever to said hanger and to said piston rod, and torsion members connecting said frame with the body of the vehicle, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

13. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, and a lever arrangement connected to said hanger and connecting said piston rod and said frame, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

14. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, and a lever arrangement connected to said hanger and connecting said piston and said frame, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

15. An elastic suspension for vehicles, comprising a plurality of hydraulic cylinders carried by the vehicle body, pistons mounted in said cylinders, piston rods attached to said pistons, coil springs mounted in said cylinders and held under compression between one face of the piston and the opposite end of the cylinder, frames carried by the axles, hangers connected to the vehicle body, and lever arrangements connected to said hangers and connecting said piston rods and said frames, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

16. An elastic suspension for vehicles, comprising a plurality of hydraulic cylinders carried by the vehicle body, pistons mounted in said cylinders, piston rods attached to said pistons, said cylinders being each provided with means for regulating the flow of liquid past said pistons, coil springs mounted in said cylinders and held under compression between one face of the piston and the opposite end of the cylinder, frames carried by the axles, hangers connected to the vehicle body, and lever arrangements connected to said hangers and connecting said piston rods and said frames, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

17. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, a bell crank lever pivoted to said frame, and links connecting said bell crank lever to said hanger and to said piston rod, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

18. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, a bell crank lever pivoted to said frame, and links connecting said bell crank lever to said hanger and to said piston rod, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, substantially as described.

19. An elastic suspension for vehicles, comprising a hydraulic cylinder carried by the vehicle body, a piston mounted in said cylinder, a piston rod attached to said piston, said cylinder being provided with means for regulating the flow of liquid past said piston, a coil spring mounted in said cylinder and held under compression between one face of the piston and the opposite end of said cylinder, a frame carried by the axle, a hanger connected to the vehicle body, and a lever arrangement connected to said hanger and connecting said piston and said frame, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, the means for controlling the flow of liquid comprising a variable passage for the transmission of liquid from one side of said piston to the other, the said passage contracting in area in opposite directions whereby the piston is permitted a limited movement only in each direction, and whereby said movement is gradually controlled.

20. An elastic suspension for vehicles, comprising a hydraulic cylinder carried by the vehicle body, a piston mounted in said cylinder, a piston rod attached to said piston, a coil spring mounted in said cylinder and held under compression between one face of the piston and the opposite end of said cylinder, a frame carried by the axle, a hanger connected to the vehicle body, a bell crank lever pivoted to said frame, and links connecting said bell crank lever to said hanger and to said piston rod, the said cylinder and piston being so constructed and arranged that said spring and the liquid contained in said hydraulic cylinder coact to resist sudden pressures applied to said piston when the downward thrust of the chassis is increased, and means controlled by said liquid alone for checking the relative movement of the axle and the chassis when the downward thrust of the chassis on the axle is decreased, the means for controlling the flow of liquid comprising a variable passage for the transmission of liquid from one side of said piston to the other, the said passage contracting in area in opposite directions whereby the piston is permitted a limited movement only in each direction, and whereby said movement is gradually controlled.

LOUIS L. DRIGGS.
LOUIS L. DRIGGS, Jr.